United States Patent
Jenkins

(10) Patent No.: US 9,550,919 B2
(45) Date of Patent: Jan. 24, 2017

(54) ANTI-BLOCKING ADHESIVE-COATED SUBSTRATE, AND A METHOD FOR MAKING THE SAME

(71) Applicant: Illinois Tool Works Inc., Glenview, IL (US)

(72) Inventor: Paul Michael Jenkins, Hendersonville, TN (US)

(73) Assignee: Illinois Tool Works Inc., Glenview, IL (US)

( * ) Notice: Subject to any disclaimer, the term of this patent is extended or adjusted under 35 U.S.C. 154(b) by 888 days.

(21) Appl. No.: 13/688,070

(22) Filed: Nov. 28, 2012

(65) Prior Publication Data

US 2014/0147636 A1      May 29, 2014

Related U.S. Application Data

(60) Provisional application No. 61/632,008, filed on Jan. 17, 2012.

(51) Int. Cl.
  *C09J 7/02*   (2006.01)
  *C09J 5/06*   (2006.01)

(52) U.S. Cl.
  CPC .. *C09J 7/02* (2013.01); *C09J 5/06* (2013.01); *C09J 2201/28* (2013.01); *Y10T 428/24612* (2015.01); *Y10T 428/2817* (2015.01)

(58) Field of Classification Search
  CPC .......... B65D 33/18; B65D 33/22; B32B 3/00; B32B 3/30; B32B 2037/1215; B32B 37/1284; B32B 37/1292; B32B 7/14; C09J 5/06; C09J 7/02; C09J 2201/28; C09J 2201/61; C09J 7/0203; Y10T 428/2817; Y10T 428/24612; A47G 27/0443; B29C 65/4815

USPC .............. 428/156, 167, 172, 343, 347, 40.1; 427/208.2
See application file for complete search history.

(56) References Cited

U.S. PATENT DOCUMENTS

| | | | |
|---|---|---|---|
| 2,197,490 A | 4/1940 | Williams et al. | |
| 3,228,585 A | 1/1966 | Fleming | |
| 3,253,593 A | 5/1966 | Cronin, Jr. | |
| 3,565,328 A * | 2/1971 | Hudson ................. | B65D 75/68 383/114 |
| 3,755,058 A * | 8/1973 | Winkler ............. | A47G 27/0443 156/219 |

(Continued)

FOREIGN PATENT DOCUMENTS

| | | |
|---|---|---|
| DE | 20009022 | 10/2000 |
| DE | 202004019818 U1 | 1/2006 |

(Continued)

*Primary Examiner* — Catherine A Simone
(74) *Attorney, Agent, or Firm* — Levenfeld Pearlstein, LLC

(57) ABSTRACT

A substrate, such as, for example, a flap member of a pinch-bottom product bag, and a method of making the same, comprises a hot melt adhesive disposed upon the substrate so as to comprise first horizontally spaced upstanding portions whereby adhesive blocking is effectively eliminated or significantly reduced. A fiberized hot melt adhesive overcoat/overspray may also be disposed atop the hot melt adhesive to further assure the elimination or reduction in the adhesive blocking. The fiberized hot melt adhesive may also be used in conjunction with a conventionally applied hot melt adhesive base or foundation upon the substrate or deposited directly onto the substrate.

6 Claims, 6 Drawing Sheets

(56) References Cited

U.S. PATENT DOCUMENTS

| | | | | |
|---|---|---|---|---|
| 4,800,110 A * | 1/1989 | DuCorday | ............ | B42D 3/002 |
| | | | | 281/21.1 |
| 5,882,573 A * | 3/1999 | Kwok | ................... | B05C 5/027 |
| | | | | 118/314 |
| 2002/0108564 A1 | 8/2002 | Gruenewald et al. | | |
| 2007/0292053 A1 | 12/2007 | Lin et al. | | |
| 2009/0291279 A1 | 11/2009 | Schroeer et al. | | |

FOREIGN PATENT DOCUMENTS

| | | | | |
|---|---|---|---|---|
| DE | 102007037754 A1 | 2/2008 | | |
| GB | 855449 | 11/1960 | | |
| GB | 2227226 | 7/1990 | | |
| GB | 2382562 | 6/2003 | | |
| WO | 0002782 A2 | 1/2000 | | |
| WO | 0208067 A2 | 1/2002 | | |
| WO | WO 2010008749 A1 * | 1/2010 | ............ | C09J 183/04 |
| WO | 2011042856 A1 | 4/2011 | | |

* cited by examiner

ANTI-BLOCKING ADHESIVE-COATED SUBSTRATE, AND A METHOD FOR MAKING THE SAME

CROSS REFERENCE TO RELATED PATENT APPLICATIONS

This patent application is related to, based upon, and effectively a utility/non-provisional patent application conversion from U.S. Provisional Patent Application Ser. No. 61/632,008 which was filed on Jan. 17, 2012, the filing date benefits of which are hereby claimed.

FIELD OF THE INVENTION

The present invention relates generally to adhesive-coated substrates, and more particularly to an adhesive-coated flap disposed upon any one of various different bags to be filled with product, wherein the adhesive coating disposed upon the product bag flap is effectively provided with anti-blocking properties so as to effectively prevent the bags, with their adhesive-coated flaps, from sticking together.

BACKGROUND OF THE INVENTION

Pinch bottom bags comprise bags manufactured by a bag manufacturer wherein one end of the bag is initially sealed at the manufacturing plant while the other end of the bag is maintained open. Pinch bottom bags are commonly used as bags within which a particular product is to be filled by end-use customers to whom the bag manufacturer sells their pinch bottom bags. The open end of the bag has an adhesive-coated flap disposed thereon which is adapted to be heat-sealed to the body portion of the bag once the bag has been filled with product by the end-user customer. The pinch bottom bags are thus sold to customers who fill the bags with a specified product wherein the product is charged or filled into the bag, and upon completion of the filling of the bag with the desired amount of product, the flap of the pinch bottom bag, which was originally disposed at the open end of the pinch bottom bag, is then closed and sealed. Examples of uses for such pinch bottom product bags are those for containing dog food, granular chemicals, grass seed, bird seed, and the like. The flaps disposed at the open end of the pinch bottom bags are coated with an adhesive in a sufficient amount so as to permit the aforenoted closing and sealing of the product bag once the product bag has been completely filled. The open end flap is folded over onto the body portion of the bag, and a sufficient amount of heat is applied to the adhesive-coated flap so as to in fact bond the flap to the body portion of the bag. After the pinch bottom bags are manufactured by the bag manufacturer, the bags are loaded or stacked on pallets, compressed together in a face-to-back mode, strapped or otherwise secured together, and shipped to the bag manufacturer's end-use customers who will then fill the bag with their particular products. It has been noted, however, that even though the adhesive disposed upon the adhesive-coated flaps is effectively cool, or is at least at room temperature, the compression of the stack of bags, and the strapping or other-wise securing together of the bags, or the weight of multiple pallets stacked one on top of another, often causes the adhesive-coated flaps to stick together. In addition, the bags may encounter heated conditions during shipping or storage. In any case, this sticking together of the adhesive-coated flap members of the product bags is known in the industry as adhesive blocking and is a substantial problem for both the bag manufacturer and the end-use customer for several reasons. Firstly, due to such adhesive blocking, multiple bags become stuck together. The customer must then manually separate the bags which is both tedious and time-consuming. Customers may even file claims against the bag manufacturer for lost production time incurred as a result of necessarily separating the bags before the bags can be inserted into or mounted upon their automated product filling machinery or apparatus.

Secondly, sometimes, for example, two bags may remain stuck together despite the best efforts of the customer personnel to separate the bags. In addition, it is often the case that whether automated machinery or semi-automated machinery is being used, the stuck-together bags will go unnoticed by operator personnel due to the fact that they have multiple operating procedures to perform while the bags are being conveyed toward, inserted into, or mounted upon the bag filling machinery or apparatus. The real problem then is that such bag filling machines are not generally equipped to handle stuck-together bags. Accordingly, when the product bags are inserted within or otherwise mounted upon the customer's product filling machinery or apparatus, the machinery will not be able to properly open the bags in preparation for the product filling or charging operations. Therefore, product to be inserted, filled, or charged into the product bags is not in fact properly filled or charged into the bags, spillage of the product will occur, and therefore the machinery will need to be shut down in order to deal with such spillage occurrences. Such machinery shutdowns obviously cause lost production time and/or lost product, all of which may result in additional claims being made by the end-use customer against the bag manufacturer.

Thirdly, the end-use customer may simply choose to return all stuck-together bags to the bag manufacturer which of course results in additional charges and a waste of money for both the bag manufacturer and the end-use customer. The bag manufacturer obviously has to accept the returned bags in view of the fact that they are effectively defective products that cannot be used by the end-user customer filling machinery. The bag manufacturer then has several options, none of which are desirable from an efficient and profitable production point of view—(1) manufacturer personnel will have to sort every bag by hand in order to find the defective adhesively blocked bags; or (2) the manufacturer will have to effectively rework the bags; or (3) the manufacturer will have to re-manufacture the bags as new bags. Regardless of the option chosen, such bags effectively serve as lost production units. In addition, the end-use customer cannot use the adhesively-blocked bags which will retard the product-filling production lines, and in addition, must invest valuable manpower into packaging the stuck-together bags in preparation for return to the bag manufacturer. Still further, the bag manufacturer will probably have to absorb the transportation costs incurred for the bags being returned to the manufacturer by the end-user customer. Furthermore, the bag manufacturer may have additional sales or technical service expenses associated with attempts to resolve the problem prior to receiving the returned bags.

A need therefore exists in the art for a new and improved substrate, and a method for fabricating the same, wherein such adhesive blocking is effectively prevented such that the operational problems and difficulties associated with such adhesive blocking do not occur.

SUMMARY OF THE INVENTION

The foregoing and other objectives are achieved in accordance with the teachings and principles of the present invention through the provision of a new and improved substrate, and a method for fabricating the same, wherein the aforenoted adhesive blocking is effectively eliminated, or at least the occurrences of such adhesive blocking are substantially reduced. More particularly, in accordance with the principles and teachings of the present invention embodied within a first embodiment of the new and improved substrate, the hot melt adhesive is applied to the substrate by means of a slot applicator, more particularly, a multi-orifice slot die. The resulting hot melt adhesive applied to the underlying substrate is effectively formed so as to comprise a multi-slot pattern comprising first high or crest regions, and second low or trough regions. By providing the low or trough regions of hot melt adhesive within the overall pattern of the hot melt adhesive disposed upon the bag flap member or substrate, wherein, for example, the height dimension of the second low or trough regions are only a fraction of the height dimension of the first high or crest regions, the amount of hot melt adhesive disposed upon the bag flap member can effectively be reduced by approximately ten to twenty-five percent (10-25%) which of course results in a considerable savings in the cost of the hot melt adhesive required to be applied to each bag flap member.

In view of the fact that the first high or crest regions have a predetermined height dimension, the concentration of hot melt adhesive within such first high or crest regions will permit the proper adhesive bonding of the bag flap member to the body portion of the product bag after the product bag has been filled with product and the product bag is to be closed and sealed. It is to be additionally noted, however, that by applying the hot melt adhesive to the bag flap member in accordance with the aforenoted multi-slot pattern, the surface area of the hot melt adhesive of each multi-slot pattern, that can come into contact with an adjacent product bag disposed within the aforenoted stacked array of bags when compressed and strapped or other-wise secured together, has effectively been reduced by fifty percent (50%) such that there is effectively insufficient hot melt adhesive present to result in the aforenoted adhesive blocking. Therefore such adhesive blocking is effectively eliminated or at least the occurrences of such adhesive blocking have effectively been significantly reduced. Still further, an additionally desirable consequence of the deposition of the hot melt adhesive within the aforenoted multi-slot pattern is that the resulting multi-slot pattern of hot melt adhesive results in a lower or smaller heat profile that permits hot melt adhesives to be deposited onto heat sensitive films. The reason for this is that when the cross-section of each first high or crest portion is viewed, the hot melt adhesive comprising each first high or crest portion is effectively open to the ambient atmosphere upon three sides—the top and both sides adjacent to the second low or trough portions. In addition, the cross-section of each second low or trough portion inherently comprises less hot melt adhesive as compared to each one of the first high or crestion portions or to a conventional solid block of hot melt adhesive. Accordingly, such second low or trough regions will also cool relatively faster. This permits the multi-slot pattern of hot melt adhesive to be used upon heat-sensitive films in view of the fact that burning or heat distortion of the films will not occur.

In accordance with additional principles and teachings of the present invention, as embodied within a second embodiment of a new and improved substrate, a hot melt adhesive base or foundation is applied to the bag flap member or substrate in a manner similar to that of the aforenoted first embodiment, however, in addition to the formation of the multi-slot pattern comprising the hot melt adhesive base or foundation disposed upon the bag flap member or substrate, a fiberized hot melt adhesive overspray is disposed atop the multi-slot patterned hot melt adhesive base or foundation. The fiberized hot melt adhesive overspray effectively has the structure and texture of fiberglass or a similar non-smooth or irregular surface. The fiberized hot melt adhesive overspray therefore provides the overall hot melt adhesive, disposed upon the bag flap member or substrate, with an external surface which is both irregular and textured whereby, again, the external surface area of the overall hot melt adhesive, which will be disposed in contact with an adjacent product bag disposed within the aforenoted stacked array of bags when compressed and strapped or otherwise secured together, has effectively been reduced such that there is effectively insufficient hot melt adhesive present to result in the aforenoted adhesive blocking. Therefore such adhesive blocking is effectively eliminated or at least the occurrences of such adhesive blocking have effectively been significantly reduced.

In accordance with still additional principles and teachings of the present invention, as embodied within a third embodiment of a new and improved substrate, a hot melt adhesive base or foundation is applied to the bag flap member or substrate in a conventional manner wherein, for example, the height dimension of the hot melt adhesive base or foundation is uniform throughout its mass, however, in addition to the formation of the conventional hot melt adhesive base or foundation upon the bag flap member or substrate, a fiberized hot melt adhesive overspray, similar to that utilized in accordance with the second embodiment, is likewise disposed atop the conventional hot melt adhesive base or foundation. Again, the fiberized hot melt adhesive overspray effectively has the structure and texture of fiberglass whereby the fiberized hot melt adhesive overspray effectively converts the uniform external surface portion of the conventional hot melt adhesive base or foundation to an external surface portion which is both irregular and textured. Accordingly, again, the external surface area of the overall hot melt adhesive, which will be disposed in contact with an adjacent product bag disposed within the aforenoted stacked array of bags when compressed and strapped or otherwise secured together, has effectively been reduced such that there is effectively insufficient hot melt adhesive present to result in the aforenoted adhesive blocking. Therefore such adhesive blocking is effectively eliminated or at least the occurrences of such adhesive blocking have effectively been significantly reduced.

It is to be additionally noted that by utilizing the fiberized hot melt adhesive overspray, the amount of hot melt adhesive utilized within the hot melt adhesive base or foundation, upon which the fiberized hot melt adhesive overspray is applied, may be reduced because the overall hot melt adhesive applied to the bag flap member or substrate will comprise both the hot melt adhesive base or foundation and the fiberized hot melt adhesive overspray. Still yet further, the fiberized hot melt adhesive overspray may comprise a hot melt adhesive which is substantially the same as or identical to the hot melt adhesive comprising the hot melt adhesive base or foundation, or alternatively, the fiberized hot melt adhesive overspray may comprise a hot melt adhesive which may be somewhat different from the hot melt adhesive material comprising the hot melt adhesive base or foundation, however, it is nevertheless considered to be within the same family of hot melt adhesive materials as that comprising the hot melt adhesive base or foundation. In this manner, when the overall hot melt adhesive assembly, comprising the hot melt adhesive base or foundation and the fiberized hot melt adhesive overspray, is heated so as to close and seal the product bag after the same has been filled with product, the two hot melt adhesive materials comprising the hot melt adhesive base or foundation and the fiberized hot melt adhesive overspray will be properly melded or fused together due to the similarity or compatibility of their chemical structures. It is lastly noted that the substrates of the present invention, in connection with which the various hot melt adhesives can be utilized, may comprise woven polypropylene (WPP) bags, polyethylene (PE) bags, multi-wall paper bags, or other heat-sensitive films or bags.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 4, is disposed atop the conventional block of hot melt adhesive;

FIGS. 4 and 5, is simply disposed atop the substrate comprising the open end flap member.

DETAILED DESCRIPTION OF THE PREFERRED EMBODIMENT

Figure 1:
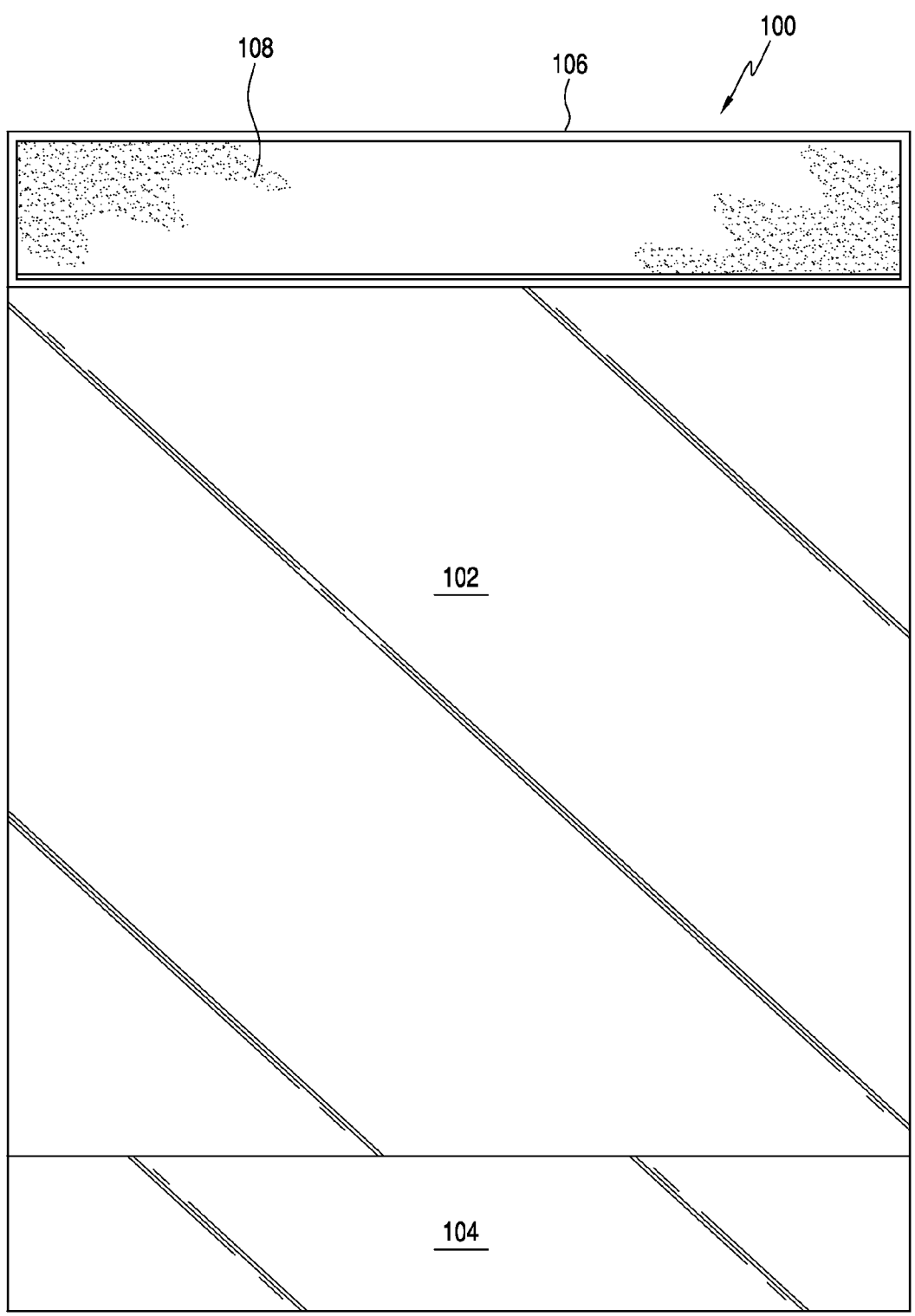
FIG. 1 is a schematic plan view of a conventional PRIOR ART pinch bottom bag.

Referring now to the drawings, and more particularly to FIG. 1 thereof, there is schematically illustrated a conventional pinch bottom product bag which is generally indicated by the reference character 100. More particularly, the conventional pinch bottom product bag 100 is seen to comprise a body portion 102 which has, for example, a first end flap member 104 disposed at the one end portion of the product bag 100 and a second end flap member 106 disposed at the other end portion of the product bag 100. Either end portion of the pinch bottom bag may be considered, for example, an upper or top end portion, or alternatively, a lower or bottom end portion of the pinch bottom bag in view of the fact that the bag manufacturers may send the bags to their customers with either end sealed and the correspondingly other end open. Thus, in the industry, the sealed end of the pinch bottom bag is called the factory or manufacturers end, while the open end of the bag, which is provided to permit the filling or the charging of product into the bag at the end-user customer's plant is called the customer or field end. As manufactured by the bag manufacturer, the first end flap member 104 of the product bag 100 is closed and sealed as a result of the first end flap member 104, disposed upon the factory end of the bag, being folded over onto the body portion 102 and sealed to the body portion 102 of the product bag 100 by means of, for example, a suitable hot melt adhesive, not shown, while the second end flap member 106, disposed at the customer end of the product bag 100, remains open.

The second end flap member 106, disposed upon the customer end of the product bag 100, has a conventional pattern of hot melt adhesive 108 disposed thereon in a uniformly applied solid block pattern having a uniform or substantially constant thickness or height dimension. Multiple product bags 100 are then shipped in this state to one of the manufacturer's customers, such as, for example, an entity that would then fill the product bag 100 with a particular product, such as, for example, dog food, granular chemicals, grass seed, bird feed, and the like, whereupon the second end flap member 106 of the product bag 100 would then be closed and sealed in a manner similar to that achieved with respect to the first end flap member 104, that is, the second end flap member 106 would be folded over onto the body portion 102 and sealed to the body portion 102 of the product bag 100 by means of, for example, heating the suitable hot melt adhesive 108, not shown, disposed thereon. It is to be noted that the thickness dimension of the hot melt adhesive 108, disposed upon the second end flap member 106, as is the case for the first end flap member 104, is approximately 4 mils and that the density of the hot melt adhesive 108 disposed upon the second end flap member 106 is approximately 0.8 gms/10 square inches of surface area of the second end flap member 106, this being the industry standard for assuring the proper hot melt adhesive bonding of the second end flap member 106 to the body portion 102 of the product bag 100.

As has been previously noted, however, difficulties are sometimes encountered when multiple conventional pinch bottom product bags 100 are shipped from the product bag manufacturer to the end-user customer such that the product bags 100 can be filled with a particular product. More particularly, after the pinch bottom product bags 100 have been manufactured by the bag manufacturer, the product bags 100 are loaded or stacked upon pallets, compressed together in a face-to-back mode, and are strapped or otherwise secured together for shipping to the bag manufacturer's end-user customers who will then fill the bag with their particular products. It has been noted, however, that even though the hot melt adhesive 108 disposed upon the second open flap members 106 is effectively cool, or are at least at room temperature, the compression of the stack of product bags 100, and the strapping or otherwise securing together of the product bags 100, often causes the hot melt adhesive 108 disposed upon the second flap members 106 to stick together. In addition, the product bags 100 may encounter adverse heat conditions during shipping, storage, or the like. The weight of several pallets containing the conventional product bags 100, wherein the pallets are stacked one on top of another, can also contribute to the conventional bags 100 being forcefully disposed in contact with each other whereby the hot melt adhesive 108 disposed upon the open end flap members 106 of the product bags 100 may become stuck together. This is known in the industry as adhesive blocking. Still yet further, the combination of certain hot melt adhesives, and certain inks contained within particular product bag logos or other pictorial indicia disposed thereon, have also produced adhesive blocking conditions due to the effective migration or intermixing occurring between the hot melt adhesive, the ink of the logo or other pictorial indicia, and the material comprising the bag. Such adhesive blocking is a substantial problem for both the bag manufacturer and the end-use customer for several reasons which have been noted hereinbefore. Accordingly, the second end flap members 106 of the conventional product bags 100 have effectively been modified in accordance with the various principles and teachings of the present invention whereby such adhesive blocking is effectively eliminated, or at least the number of occurrences of such adhesive blocking have been significantly reduced.

Figure 2:
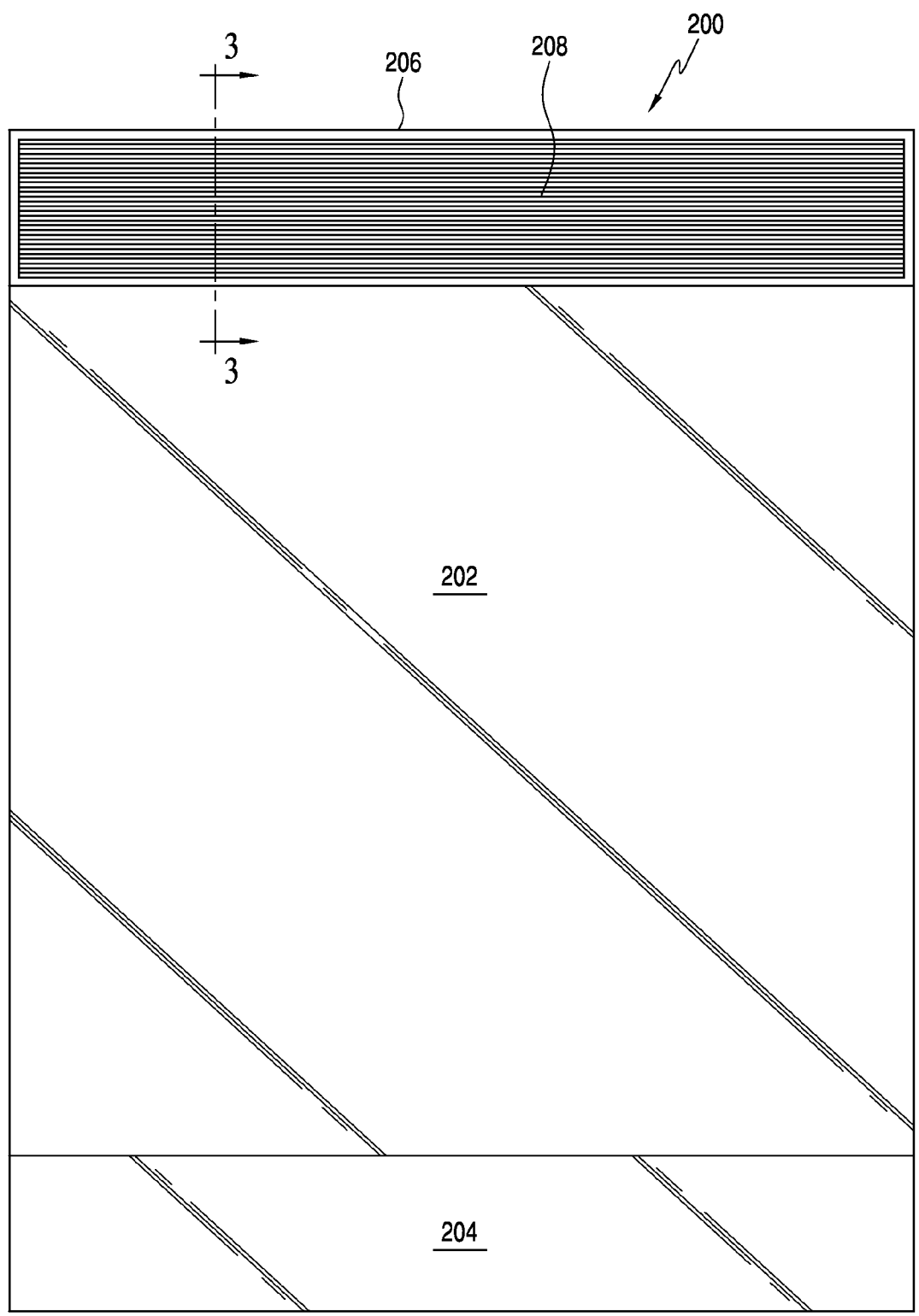
FIG. 2 is a plan view of a pinch bottom bag illustrating a first embodiment of a new and improved open flap member having a multi-slot pattern of hot melt adhesive disposed thereon.
Figure 3:
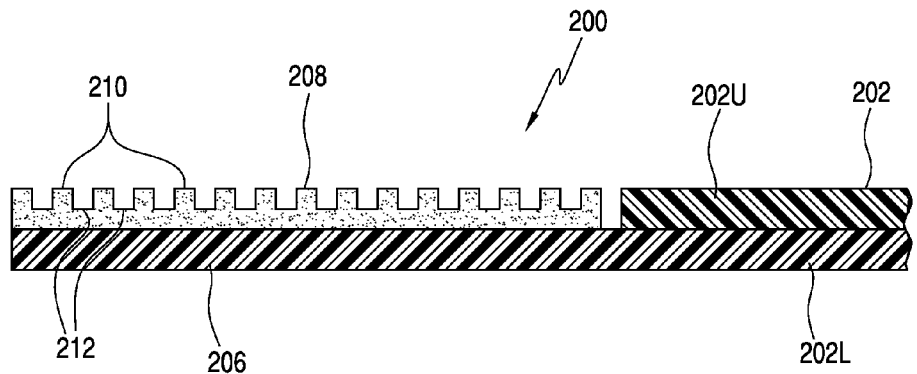
FIG. 3 is a cross-sectional view of the pinch bottom bag illustrated within FIG. 2 as taken along the lines 3-3 of FIG. 2.

With reference therefore now being made to FIGS. 2 and 3, a first embodiment of a new and improved substrate, such as, for example, a second end flap member 206 of a product bag, generally indicated by the reference character 200, is illustrated. It is to be noted that corresponding parts or components of the product bag 200, which correspond to similar parts or components of the conventional PRIOR ART product bag 100, will be provided with similar reference characters except that they will be within the 200 series. As was the case with the conventional product bag 100 illustrated within FIG. 1, the product bag 200 is seen to comprise a body portion 202, a first end flap member 204 which is disposed upon a first end portion of the product bag 200 and which has been closed and sealed with respect to the body portion 202 of the product bag 200 by means of the product bag manufacture, and a second end flap member 206 which is disposed upon the opposite end of the product bag 200 which has remained open so as to permit the product bag customer to fill the product bag with any one of the previously noted products. As can best be appreciated from FIG. 3, the body portion 202 of the product bag 200 actually comprises an upper body portion 202U and a lower body portion 202L between which the product bag 200 defines an enclosed compartment into which the particular product is to be charged or filled.

In accordance with the principles and teachings of the present invention, it can also be seen that in lieu of the hot melt adhesive being applied to the second end flap member 206 in a uniform manner, having a substantially constant thickness or height dimension throughout substantially the entire longitudinal extent and the transverse width of the second flap member 206, as was the case with the hot melt adhesive 108 applied to the second flap member 106 of the product bag 100, the hot melt adhesive 208 is applied to the second end flap member 206 by means of a slot applicator, more particularly, a multi-orifice slot die, whereby the resulting hot melt adhesive 208, applied to the underlying substrate or second end flap member 206, is effectively formed so as to comprise a multi-slot pattern comprising a plurality of first horizontally spaced, upstanding portions or regions 210, and a plurality of second horizontally spaced portions or regions 212 interposed between the plurality of first horizontally spaced upstanding portions or regions 210. Viewed from a slightly different structural perspective, the plurality of first horizontally spaced, upstanding portions or regions 210 may be considered high or crest portions of the hot melt adhesive 208, while the plurality of second horizontally spaced portions or regions 212 may be considered low or trough portions or regions of the hot melt adhesive 208. The height dimension of each one of the plurality of first high or crest regions 100 is approximately 4 mils, while the height dimension of each one of the plurality of second low or trough regions 112 is approximately 2 mils. Accordingly, one commercial benefit of the first embodiment adhesive pattern 208 as applied to the underlying substrate or second end flap member 206 of the product bag 200 is that the amount of hot melt adhesive 208 is approximately 10-25% less than that utilized conventionally, which of course results in a considerable savings in the cost of the hot melt adhesive required to be applied to each bag end flap member.

Nevertheless, by effectively maintaining the height dimension of the hot melt adhesive 208, within the high or crest regions 210 at approximately 4 mils, the concentration of the hot melt adhesive 208 within such first high or crest regions 210 is sufficient so as to in fact achieve the desired proper bonding of the second end flap member 206 to the upper body portion 202U of the product bag 200 when the product bag 200 has been filled with product and the second end flap member 206 is to be closed and sealed by bonding the same to, for example, the upper body portion 202U of the product bag 200. In addition, by applying the hot melt adhesive 208 to the second end flap member 206 in accordance with the aforenoted multi-slot pattern, the external surface area of the hot melt adhesive 208, comprising the aforenoted multi-slot pattern, that can come into contact with an adjacent product bag disposed within the aforenoted stacked array of product bags when compressed and strapped or otherwise secured together, has effectively been reduced by fifty percent (50%) such that there is effectively insufficient hot melt adhesive 208 present upon the second flap members 206 to result in the aforenoted adhesive blocking. Therefore such adhesive blocking is effectively eliminated or at least the occurrences of such adhesive blocking have effectively been significantly reduced.

The reason for this is that with the conventional adhesive pattern, sufficient adhesive, as defined by surface area, is present such that even when the adhesive has cooled and is in a relatively cool state, bonding to adjacent bags is still possible whereby the undesired blocking occurs. With the adhesive pattern characteristic of the present invention as disclosed within FIG. 3, the reduction in the overall volumetric amount of adhesive, and the reduction in the overall surface area of the adhesive, as defined by means of the crest portions 210, is insufficient to result in the aforenoted adhesive bonding or blocking between adjacent product bags. However, when the second end flap member 206 is desired to be bonded, for example, to the upper body portion 202U of the product bag 200, then upon heating of the hot melt adhesive 208 by any suitable means known in the industry and prior to the bonding of the second end flap member 206 to the upper body portion 202U of the product bag 200, sufficient hot melt adhesive 208 is in fact present so as to achieve the desired bonding of the second end flap member 206 to the upper body portion 202U of the product bag 200. It is to be noted that the substrates of the present invention, in connection with which the various hot melt adhesives can be utilized, may comprise woven polypropylene (WPP) bags, polyethylene (PE) bags, multi-wall paper bags, or other heat-sensitive bags.

With reference still being made to FIG. 3, it is further noted that another advantage of the use of the hot melt adhesive pattern 208 disclosed within FIG. 3, and employed in accordance with the principles and teachings of the present invention, resides in the fact that each crest segment, portion, or region 210 of the hot melt adhesive 208 is effectively open to ambient air upon three sides thereof. More particularly, the left side of each crest segment, portion, or region 210 of the hot melt adhesive 208 is open or exposed to the ambient air, the right side of each crest segment, portion, or region 210 of the hot melt adhesive 208 is open or exposed to the ambient air, and the top or upper side or surface of each crest segment, portion, or region 210 of the hot melt adhesive 208 is likewise open or exposed to the ambient air. In this manner, the hot melt adhesive 208 can begin to cool in a significantly more efficient manner than a conventional deposit of hot melt adhesive applied to end flap members as disclosed, for example, within FIG. 1, such that when the hot melt adhesive pattern 208 is applied, for example, to the first end flap member 204 which is then folded over so as to be bonded onto the upper body portion 202U of the product bag 200 in order to form or define the closed, sealed, manufacture's end of the product bag 200, the heat disposed within the hot melt adhesive 208 will not be sufficient, or so excessive, as to distort or otherwise damage the first end flap member 204, the upper body portion 202U of the product bag 200, or the lower body portion 202L of the product bag 200.

Figure 6:
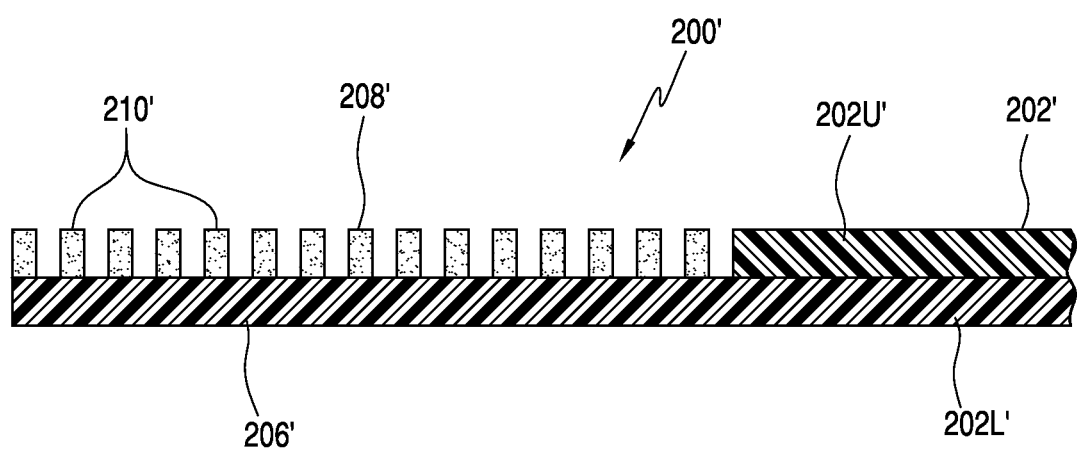
FIG. 6 is a cross-sectional view of a pinch bottom bag, similar to that of FIG. 3, illustrating, however, a modified multi-slot pattern of hot melt adhesive, relative to the adhesive pattern illustrated within FIG. 3, disposed thereon wherein the trough sections of the hot melt adhesive have effectively been eliminated.

With reference now being made to FIG. 6, a modified embodiment of a new and improved substrate, such as, for example, a second end flap member 206' of a product bag, generally indicated by the reference character 200', is illustrated. It is to be noted that corresponding parts or components of the product bag 200', which correspond to similar parts or components of the product bag 200 illustrated within FIG. 3, will be provided with similar reference characters except that they will be within the 200' series. More particularly, it will appreciated by reference being made to the second end flap portion 206' of the product bag 200', that the hot melt adhesive pattern 208' has been modified somewhat from the hot melt adhesive pattern 208 characteristic of the second end flap portion 206 of the product bag 208, as illustrated in FIG. 3, in that the trough regions 212 of the second end flap portion 206 of the product bag 208 have effectively been eliminated whereby the hot melt adhesive pattern 208', disposed upon the second flap portion 206' of the product bag 200', now only comprises the plurality of horizontally spaced, first upstanding or high crest portions 210'. In this manner, all of the positive advantages or attributes characteristic of the second end flap portion 206 of the product bag 208 have effectively been maintained while the volumetric amount of hot melt adhesive 208' disposed upon the second end flap portion 206' of the product bag 208' has been reduced even further.

More particularly, sufficient hot melt adhesive surface area is still defined by means of the cumulative amount of the surface areas of all of the first upstanding or high crest portions or regions 210' of the hot melt adhesive 208' so as to provide sufficient adhesive bonding of the second end flap member 206' onto the upper surface portion 202U' of the product bag 200' when the hot melt adhesive is heated, however, insufficient cumulative surface area is present whereby blocking will not present a significant problem.

Figure 4:
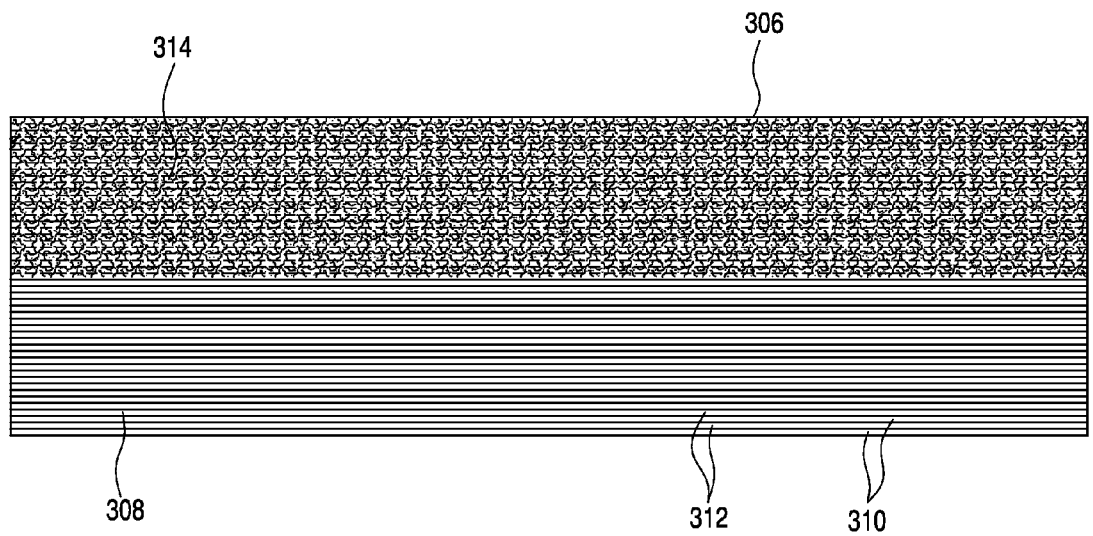
FIG. 4 is a plan view of a second embodiment of a new and improved open flap member having a multi-slot pattern of hot melt adhesive disposed thereon in a manner similar to that illustrated within FIG. 2 wherein, however, a fiberized hot melt adhesive overcoat/overspray is disposed atop the multi-slot pattern of hot melt adhesive.

With reference now being made to FIG. 4, a second embodiment of a new and improved substrate, such as, for example, a second flap member 306 of a product bag, is illustrated. It is again noted that corresponding parts or components of the product bag 300, which correspond to similar parts or components of the product bag 200, will be provided with similar reference characters except that they will be within the 300 series. As was the case with the first embodiment of the second flap member 206 having the hot melt adhesive 208 disposed thereon within the aforenoted multi-slot pattern comprising the first high or crest regions 210 and the second low or trough regions 212 as illustrated within FIGS. 2 and 3, the multi-slot pattern of the hot melt adhesive 308, disposed upon the second end flap member 306, likewise comprises first high or crest regions 310 and second low or trough regions 312. In accordance with additional principles and teachings of the present invention as embodied within this second embodiment of the new and improved substrate or second end flap member 306 of the product bag, however, the hot melt adhesive 308 is effectively applied as a base or foundation to the substrate or second end flap member 306 of the product bag, and, in addition to the formation of such multi-slot pattern comprising the hot melt adhesive base or foundation 308 disposed upon the second end flap member 306, a fiberized hot melt adhesive overcoat/overspray 314 is disposed atop the multi-slot patterned hot melt adhesive base or foundation 308. While the fiberized hot melt adhesive overcoat/overspray 314 has been illustrated within only the top half of the second end flap member 306 of FIG. 4 for clarity purposes, it is to be understood that the entire extent of the underlying multi-slot hot melt adhesive base or foundation 308 is to be completely covered by means of the fiberized hot melt adhesive overcoat/overspray 314, the dichotomy between the underlying multi-slot hot melt adhesive base or foundation 308 and the fiberized hot melt adhesive overcoat/overspray 314 being utilized within FIG. 4 so as to merely visually emphasize the differences between the two materials or patterns.

The fiberized hot melt adhesive overcoat/overspray 314 effectively has the structure and texture of fiberglass or some other non-smooth surface. The fiberized hot melt adhesive overcoat/overspray 314 therefore provides the overall hot melt adhesive, disposed upon the second flap member 306, with an external surface which is both irregular and textured whereby, again, the external surface area of the overall hot melt adhesive, which will be disposed in contact with an adjacent product bag disposed within the aforenoted stacked array of product bags when compressed and strapped or otherwise secured together upon shipping or storage pallets, has effectively been reduced still further and is more inconsistent as a planar surface such that there is effectively insufficient hot melt adhesive present to result in the aforenoted adhesive blocking. Therefore such adhesive blocking is effectively eliminated or at least the occurrences of such adhesive blocking have effectively been significantly reduced whereby, in turn, the aforenoted operational difficulties associated with adhesive blocking are eliminated or effectively reduced. As was noted in connection with the adhesive pattern 208 of FIG. 3, when it is desired to bond the second end flap member 306 to the body portion of the product bag, the heating of the hot melt adhesive patterns 308,314 will be sufficient to achieve the adhesive bonding. It is of course to also be appreciated that the overcoat/overspray 314 can be similarly applied atop the slot pattern hot melt adhesive 208' as illustrated within FIG. 6.

Figure 5:
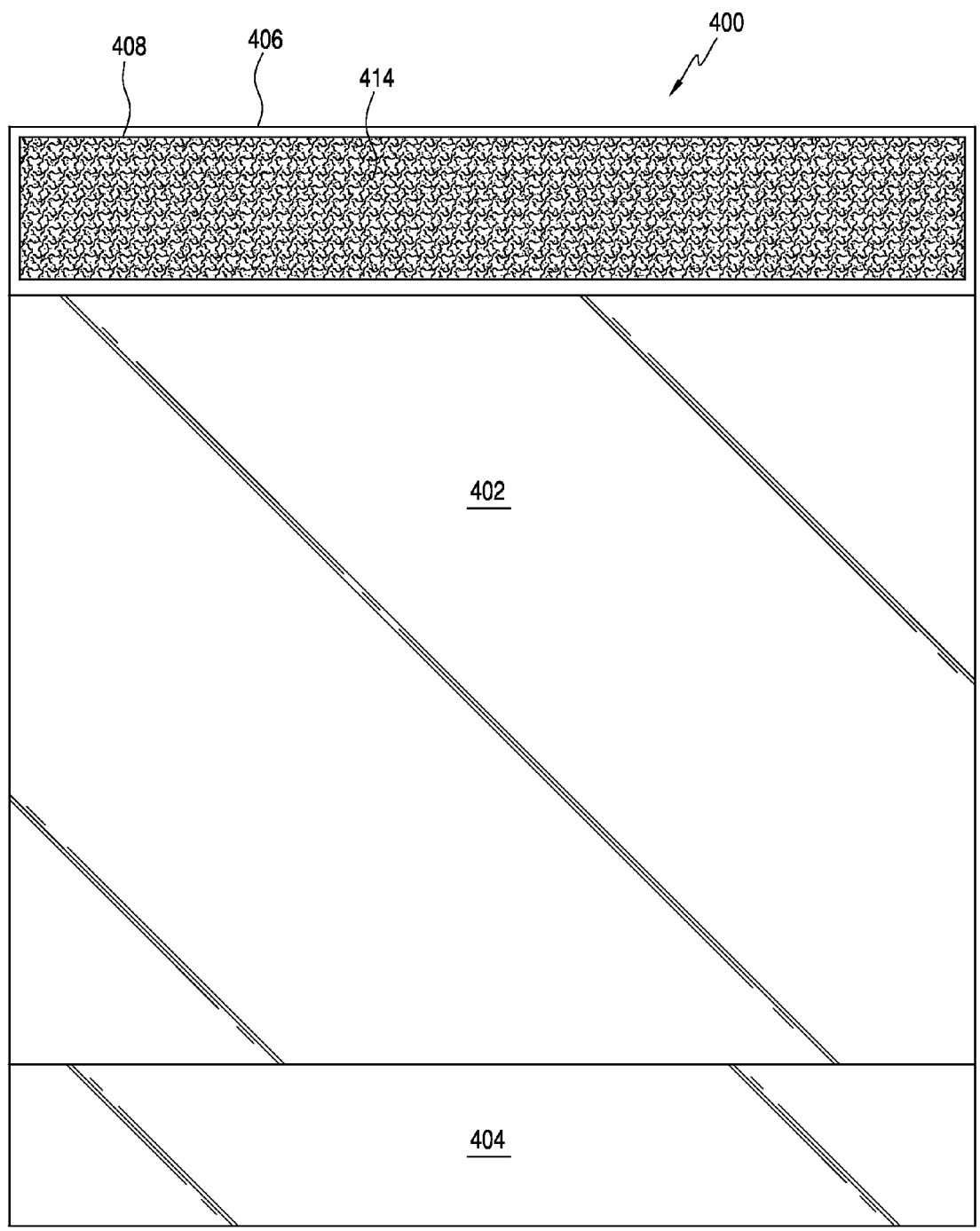
FIG. 5 is a plan view of a third embodiment of a new and improved open flap member having a conventional solid block pattern of hot melt adhesive disposed thereon in a manner similar to that illustrated within FIG. 1 wherein, however, a fiberized hot melt adhesive overcoat/overspray, similar to that illustrated within

With reference now being made to FIG. 5, a third embodiment of a new and improved substrate, such as, for example, a second end flap member 406 of a product bag, generally indicated by the reference character 400, is illustrated. It is again noted that corresponding parts or components of the product bag 400, which correspond to similar parts or components of the product bags 200, 00 will be provided with similar reference characters except that they will be within the 400 series. As was the case with the conventional product bag 100 illustrated within FIG. 1, the product bag 400 is seen to comprise a body portion 402, a first end flap member 404 disposed at one end of the pinch bottom bag 400 and closed and sealed with respect to the body portion 402 thereof, and a second end flap member 406 disposed upon the opposite end of the product bag 400 and which has remained open. In accordance with the principles and teachings of this third embodiment of the present invention, a uniform hot melt adhesive base or foundation 408 is applied to the second end flap member 406 in a conventional manner such that the height or depth dimension of the hot melt adhesive base or foundation 408, disposed upon the second end flap member 406, is substantially uniform or constant throughout its mass. However, in addition to the formation of the conventional hot melt adhesive base or foundation 408 upon the second end flap member 406, a fiberized hot melt adhesive overcoat/overspray 414, similar to the overcoat/overspray 314 utilized in accordance with the second embodiment as illustrated within FIG. 4, is disposed atop the conventional hot melt adhesive base or foundation 408. Again, the fiberized hot melt adhesive overcoat/overspray 414 effectively has the structure and texture of fiberglass or some other non-smooth surface whereby the fiberized hot melt adhesive overcoat/overspray 414 effectively converts the uniform external surface portion of the conventional hot melt adhesive base or foundation 408 to an external surface portion which is both irregular and textured. Accordingly, again, the external surface area of the overall hot melt adhesive, which will be disposed in contact with an adjacent product bag disposed within the aforenoted stacked array of bags when compressed and strapped or otherwise secured together for shipping or storage, has effectively been reduced such that there is effectively insufficient hot melt adhesive present to result in the aforenoted adhesive blocking. Therefore such adhesive blocking is effectively eliminated or at least the occurrences of such adhesive blocking have effectively been significantly reduced.

It is to be additionally noted that by utilizing the fiberized hot melt adhesive overcoat/overspray 414, the volumetric amount of hot melt adhesive utilized within the hot melt adhesive base or foundation 408, upon which the fiberized hot melt adhesive overcoat/overspray 414 is applied, may be reduced because the overall hot melt adhesive applied to the second end flap member or substrate 406 will comprise both the hot melt adhesive base or foundation 408 and the fiberized hot melt adhesive overcoat/overspray 414. Still yet further, the fiberized hot melt adhesive overcoat/overspray 414 may comprise a hot melt adhesive which is substantially the same as, or identical to, the hot melt adhesive comprising the hot melt adhesive base or foundation 408, or alternatively, the fiberized hot melt adhesive overcoat/overspray 414 may comprise a hot melt adhesive, or another material, which may be somewhat different from the hot melt adhesive material comprising the hot melt adhesive base or foundation 408, although it is nevertheless considered to be within the same family of hot melt adhesive materials as that comprising the hot melt adhesive base or foundation 408. In this manner, when the overall hot melt adhesive assembly, comprising the hot melt adhesive base or foundation 408 and the fiberized hot melt adhesive overcoat/overspray 414, is heated so as to close and seal the product bag 400 after the same has been filled with product, the two hot melt adhesive materials comprising the hot melt adhesive base or foundation 408 and the fiberized hot melt adhesive overcoat/ overspray 414 will be properly melded or fused together due to the similarity or compatibility of their chemical structures.

Figure 7:
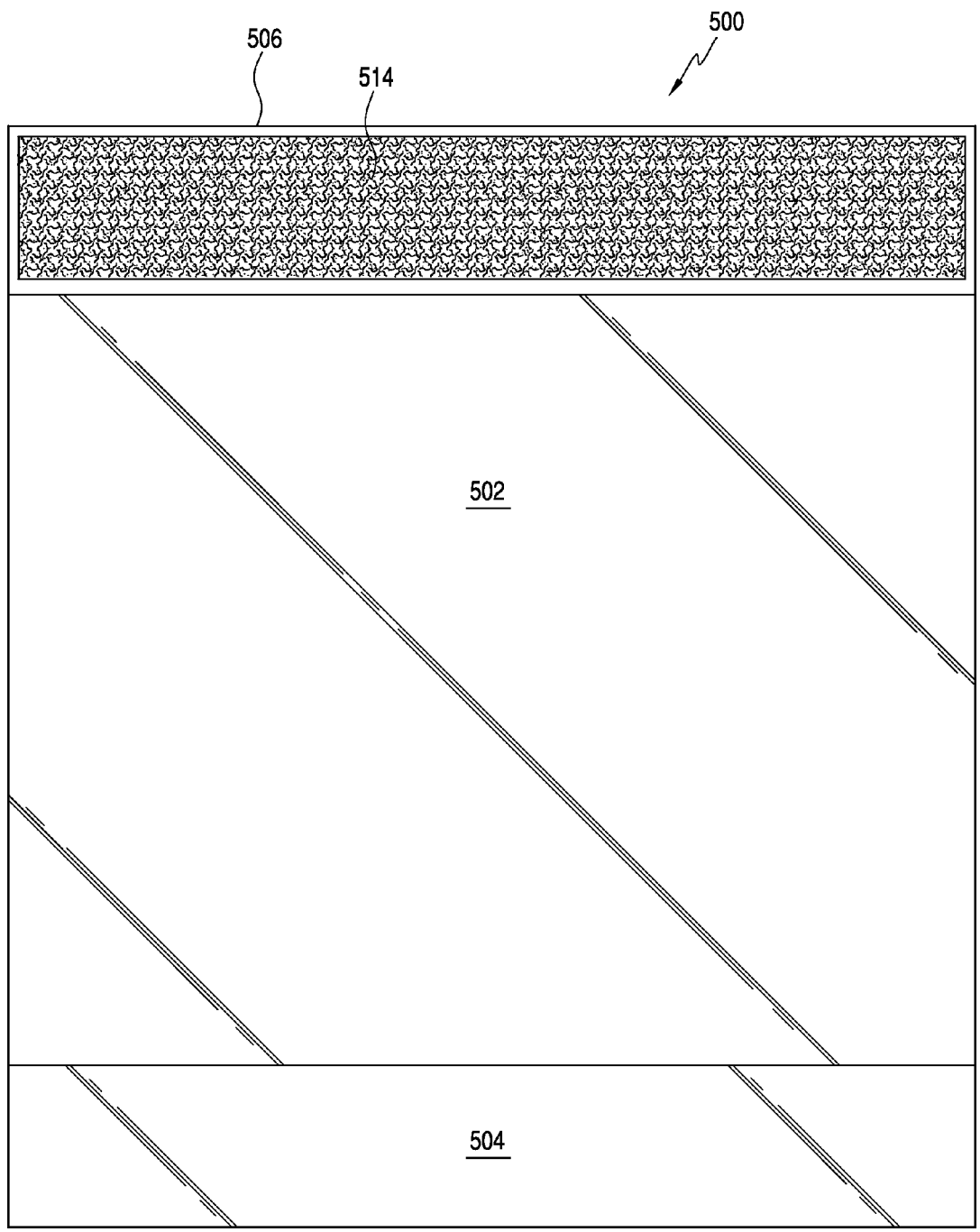
FIG. 7 is a plan view of a fourth embodiment of a new and improved open flap member wherein a fiberized hot melt adhesive overcoat/overspray, similar to that illustrated within

With reference lastly being made to FIG. 7, a fourth embodiment of a new and improved substrate, such as, for example, a second end flap member 506 of a product bag, generally indicated by the reference character 500, is illustrated. It is again noted that corresponding parts or components of the product bag 500, which correspond to similar components or parts of the product bags 200,300,400 will be provided with similar reference characters except that they will be within the 500 series. More particularly, in accordance with the principles and teachings of the present invention embodiment, it is seen that this embodiment of the product bag 500 comprises the body portion 502, the first end flap member 504, and the second end flap member 506, however, there is no underlying adhesive, either in conventional form as at 108 as illustrated within FIG. 1, or as at 208,308, or 408 as illustrated within FIGS. 2-6. To the contrary, only an overcoat/overspray 514, similar to the oversprays 314,414, is applied to the second end flap member 506. Again, all of the positive advantages or attributes characteristic of the overcoats/oversprays 314,414 are effectively retained while reducing the overall volumetric amount of hot melt adhesive actually applied to the second end flap member 506. More particularly, sufficient hot melt adhesive surface area is defined by means of the overspray pattern of the hot melt adhesive so as to provide sufficient adhesive bonding of the second end flap member 506 onto, for example, the upper surface portion 502U of the product bag 500 when the hot melt adhesive is heated, however, insufficient cumulative surface area is present whereby blocking will not present a problem as a result of having effectively been eliminated or the occurrences of such having been significantly reduced.

Obviously, many variations and modifications of the present invention are possible in light of the above teachings. It is therefore to be understood that within the scope of the appended claims, the present invention may be practiced otherwise than as specifically described herein.

What is new and desired to be protected by means of Letters Patent of the United States is:

1. An adhesive-coated substrate comprising:
   a substrate having a predetermined surface area; and
   a hot melt adhesive disposed upon said substrate, wherein said hot melt adhesive comprises a multi-slot pattern comprising a plurality of first, horizontally spaced, upstanding high-crest portions, wherein each one of said plurality of first, horizontally spaced upstanding high-crest portions has a substantially first predetermined height dimension such that said plurality of first, horizontally spaced, upstanding high-crest portions of said hot melt adhesive cumulatively define a predetermined volumetric amount and surface area of said hot melt adhesive so as to provide sufficient adhesive bonding as necessary, and a plurality of second, horizontally spaced low-trough portions interposed between said plurality of first high-crest portions, wherein each one of said plurality of second, horizontally spaced low-trough portions of said hot melt adhesive has a second predetermined height dimension which is less than said first predetermined height dimension of each one of said plurality of first, horizontally spaced, upstanding high-crest portions, so as to effectively define a relatively reduced overall surface area of said hot melt adhesive relative to said predetermined surface area of said substrate, so as to thereby effectively eliminate or significantly reduce adhesive blocking, wherein said first predetermined height dimension of each one of said plurality of horizontally spaced first high-crest upstanding portions of said hot melt adhesive is approximately 4 mils, while said second predetermined height dimension of each one of said plurality of horizontally spaced second low-trough portions of said hot melt adhesive is approximately 2 mils.

2. An adhesive-coated substrate comprising:
a substrate having a predetermined surface area;
a hot melt adhesive disposed upon said substrate, wherein said hot melt adhesive comprises a multi-slot pattern comprising a plurality of first, horizontally spaced, upstanding portions, wherein each one of said plurality of first, horizontally spaced upstanding portions has a substantially first predetermined height dimension such that said plurality of first, horizontally spaced, upstanding portions of said hot melt adhesive cumulatively define a predetermined volumetric amount and surface area of said hot melt adhesive so as to provide sufficient adhesive bonding as necessary and effectively define a relatively reduced overall surface area of said hot melt adhesive, relative to said predetermined surface area of said substrate; and
a fiberized hot melt adhesive overcoat/overspray disposed atop said plurality of first horizontally spaced upstanding portions of said hot melt adhesive disposed upon said substrate so as to effectively reduce adhesive blocking.

3. The substrate as set forth in claim 2, wherein a plurality of second, horizontally spaced portions of said hot melt adhesive respectively interposed between adjacent pairs of said plurality of first, horizontally spaced upstanding portions of said hot melt adhesive, wherein each one of said plurality of second, horizontally spaced portions of said hot melt adhesive has a second predetermined height dimension which is less than said first predetermined height dimension of each one of said plurality of first, horizontally spaced, upstanding portions so as to effectively reduce the overall volumetric amount of said hot melt adhesive disposed upon said substrate, wherein the fiberized hot melt adhesive overcoat/overspray is disposed atop said plurality of first and second horizontally spaced portions of said hot melt adhesive disposed upon said substrate so as to effectively reduce adhesive blocking.

4. A method of forming an adhesive-coated substrate comprising the steps of:
providing a substrate having a predetermined surface area;
depositing a hot melt adhesive upon said substrate such that said hot melt adhesive comprises a multi-slot pattern comprising a plurality of first, horizontally spaced, upstanding portions wherein each one of said plurality of first, horizontally spaced upstanding portions has a substantially first predetermined height dimension such that said plurality of first, horizontally spaced, upstanding portions of said hot melt adhesive cumulatively define a predetermined volumetric amount and surface area of said hot melt adhesive so as to provide sufficient adhesive bonding as necessary and effectively define a relatively reduced overall surface area of said hot melt adhesive, relative to said predetermined surface area of said substrate so as to thereby effectively eliminate or significantly reduce adhesive blocking;
providing said hot melt adhesive disposed upon said substrate with a plurality of second, horizontally spaced portions of said hot melt adhesive respectively interposed between adjacent pairs of said plurality of first, horizontally spaced upstanding portions of said hot melt adhesive, wherein each one of said plurality of second, horizontally spaced portions of said hot melt adhesive has a second predetermined height dimension which is less than said first predetermined height dimension of each one of said plurality of first, horizontally spaced, upstanding portions so as to effectively reduce the overall volumetric amount of said hot melt adhesive disposed upon said substrate;
providing each one of said plurality of horizontally spaced first upstanding portions of said hot melt adhesive with a height/depth dimension of approximately 4 mils; and
providing each one of said plurality of horizontally spaced second portions of said hot melt adhesive with a height/depth dimension of approximately 2 mils.

5. A method of forming an adhesive-coated substrate comprising the steps of:
providing a substrate having a predetermined surface area;
depositing a hot melt adhesive upon said substrate such that said hot melt adhesive comprises a multi-slot pattern comprising a plurality of first, horizontally spaced, upstanding portions wherein each one of said plurality of first, horizontally spaced upstanding portions has a substantially first predetermined height dimension such that said plurality of first, horizontally spaced, upstanding portions of said hot melt adhesive cumulatively define a predetermined volumetric amount and surface area of said hot melt adhesive so as to provide sufficient adhesive bonding as necessary and effectively define a relatively reduced overall surface area of said hot melt adhesive, relative to said predetermined surface area of said substrate so as to thereby effectively eliminate or significantly reduce adhesive blocking; and
disposing a fiberized hot melt adhesive overcoat/overspray atop said plurality of first horizontally spaced upstanding portions of said hot melt adhesive disposed upon said substrate so as to effectively reduce adhesive blocking.

6. The method as set forth in claim 5, further comprising the step of:
providing said hot melt adhesive disposed upon said substrate with a plurality of second, horizontally spaced portions of said hot melt adhesive respectively interposed between adjacent pairs of said plurality of first, horizontally spaced upstanding portions of said hot melt adhesive, wherein each one of said plurality of second, horizontally spaced portions of said hot melt adhesive has a second predetermined height dimension which is less than said first predetermined height dimension of each one of said plurality of first, horizontally spaced, upstanding portions so as to effectively reduce the overall volumetric amount of said hot melt adhesive disposed upon said substrate, and
disposing a fiberized hot melt adhesive overcoat/overspray atop said plurality of first and second horizontally spaced portions of said hot melt adhesive disposed upon said substrate so as to effectively reduce adhesive blocking.

* * * * *